United States Patent [19]
Takahashi et al.

[11] Patent Number: 6,097,354
[45] Date of Patent: Aug. 1, 2000

[54] IMAGE DISPLAY APPARATUS

[75] Inventors: Koichi Takahashi, Hachioji; Junko Takahashi, Atsugi, both of Japan

[73] Assignee: Olympus Optical Co., Ltd., Tokyo, Japan

[21] Appl. No.: 09/084,492

[22] Filed: May 27, 1998

[30]     Foreign Application Priority Data

May 27, 1997   [JP]   Japan ................................. 9-136725

[51] Int. Cl.⁷ ............................ G09G 5/00; G02B 27/14
[52] U.S. Cl. ................................. 345/8; 345/7; 359/630; 359/631
[58] Field of Search ............................ 345/7–8; 359/630, 359/631

[56]                References Cited

U.S. PATENT DOCUMENTS

| | | |
|---|---|---|
| Re. 27,356 | 5/1972 | Russa . |
| 3,810,221 | 5/1974 | Plummer . |
| 3,836,931 | 9/1974 | Plummer . |
| 4,026,641 | 5/1977 | Bosserman et al. . |
| 4,322,135 | 3/1982 | Freeman . |
| 4,669,810 | 6/1987 | Wood . |
| 4,969,724 | 11/1990 | Ellis . |
| 5,309,169 | 5/1994 | Lippert ......................................... 345/8 |
| 5,436,763 | 7/1995 | Chen et al. ............................... 359/630 |
| 5,539,422 | 7/1996 | Heacock et al. . |
| 5,880,888 | 3/1998 | Shoenmaker et al. ................... 359/631 |
| 5,940,218 | 8/1999 | Takahashi et al. ....................... 359/630 |

FOREIGN PATENT DOCUMENTS

| | | |
|---|---|---|
| 583 116 | 2/1994 | European Pat. Off. . |
| 687 932 | 12/1995 | European Pat. Off. . |
| 730 183 | 9/1996 | European Pat. Off. . |
| 3-101709 | 4/1991 | Japan . |
| 8-509075 | 9/1996 | Japan . |

OTHER PUBLICATIONS

Japanese Patent laid-open publication No. 62–214782, S.Kanda, Sep. 21, 1987.

Japanese Patent laid-open publication No. 7–104209, S. Yamazaki, Apr. 21, 1995.

Primary Examiner—Richard A. Hjerpe
Assistant Examiner—Duc Dinh
Attorney, Agent, or Firm—Pillsbury Madison & Sutro LLP

[57]                ABSTRACT

An image display apparatus capable of providing a clear observation image at a wide field angle by using an ocular optical system including an optical element having a minimal number of constituent surfaces. The apparatus includes an image display device (5) which displays an image, and an ocular optical system (4) which projects the image formed by the image display device (5) and leads the image to an observer's eyeball (3). The ocular optical system (4) has two surfaces, i.e. a first surface (11) and a second surface (12). A space formed by the two surfaces is filled with a medium having a refractive index larger than 1. At least one surface of the ocular optical system (4) is a non-rotationally symmetric aspherical surface decentered or tilted with respect to an observer's visual axis (2). The first surface (11) is a transmitting surface which serves as both an entrance surface for light rays emitted from the image display device (5) and an exit surface through which the light rays exit from the ocular optical system (4). The first surface (11) is convex toward the observer.

11 Claims, 7 Drawing Sheets

IMAGE DISPLAY APPARATUS

BACKGROUND OF THE INVENTION

The present invention relates to an image display apparatus and, more particularly, to a head- or face-mounted image display apparatus that can be retained on the observer's head or face.

A conventional image display apparatus is disclosed in Japanese Patent Application Unexamined Publication (KOKAI) No. 3-101709 (1991). In the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of conventional image display apparatus. In this apparatus, an image of a CRT is transmitted through a relay optical system to form an intermediate image, and the image is projected into an observer's eye by a combination of a reflection holographic element and a combiner having a hologram surface.

U.S. Pat. No. 4,026,641 discloses another type of conventional image display apparatus. In this apparatus, an image of an image display device is transferred to a curved object surface by an image transfer device, and the image transferred to the object surface is projected in the air by a toric reflector.

U.S. Reissued Pat. No. 27,356 discloses another type of conventional image display apparatus. The apparatus is an ocular optical system which projects an object surface onto an exit pupil by a combination of a semitransparent concave mirror and a semitransparent plane mirror.

Other known image display apparatuses include those which are disclosed in U.S. Pat. Nos. 4,322,135 and 4,969,724, European Patent No. 0,583,116A2, and Japanese Patent Application Unexamined Publication (KOKAI) No. 7-333551 (1995).

In these conventional techniques, a plurality of optical elements are needed to constitute an ocular optical system, or three or more surfaces are needed to constitute an optical element which forms an ocular optical system. Further, a reflecting surface and a transmitting surface, which constitute an optical system, are formed by using a spherical surface, a rotationally symmetric aspherical surface, a toric surface, an anamorphic surface, etc. Therefore, it has heretofore been impossible to favorably correct ray aberration and distortion at the same time.

If an image for observation is not favorably corrected for both aberration and distortion, the image is distorted as it is viewed by an observer. If the observation image is distorted such that images viewed with the user's left and right eyes are not in symmetry with each other, the two images cannot properly be fused into a single image. In the case of displaying a figure or the like, the displayed figure appears to be distorted, making it impossible to correctly recognize the shape of the displayed figure.

SUMMARY OF THE INVENTION

In view of the above-described problems of the conventional techniques, an object of the present invention is to provide an image display apparatus capable of providing a clear observation image at a wide field angle by using an ocular optical system including an optical element having a minimal number of constituent surfaces.

To attain the above-described object, the present invention provides an image display apparatus including an image display device which displays an image, and an ocular optical system which projects the image formed by the image display device and leads the image to an eyeball of an observer. The ocular optical system has two surfaces, i.e. a first surface and a second surface. A space formed by the two surfaces is filled with a medium having a refractive index larger than 1. At least one of the surfaces of the ocular optical system is a non-rotationally symmetric aspherical surface decentered or tilted with respect to an observer's visual axis. The first surface is a transmitting surface which serves as both an entrance surface for light rays emitted from the image display device and an exit surface through which the light rays exit from the ocular optical system. The first surface is convex toward the observer.

In addition, the present invention provides an image display apparatus including an image display device which displays an image, and an ocular optical system which projects the image formed by the image display device and leads the image to an eyeball of an observer. The ocular optical system has a prism member. The prism member includes a first surface having an action through which light rays emitted from the image display device enter the prism member and exit therefrom. The prism member further includes a second surface having an action by which the light rays entering through the first surface are reflected. A space between the first surface and the second surface is filled with a medium having a refractive index larger than 1. The first and second surfaces each have a non-rotationally symmetric aspherical surface configuration having an action by which the image formed by the image display device is projected into the observer's eyeball as an enlarged image. The non-rotationally symmetric aspherical surface configuration further has an action by which aberrations caused by decentration are corrected.

Assuming that a light ray emitted from the center of the image display device and passing through the center of an exit pupil formed by the ocular optical system is defined as an axial principal ray, it is desirable that the axial principal ray should form a V-shaped folded optical path in the prism member, and that the sectional configuration of the first surface in a plane (YZ-plane) containing the V-shaped optical path should be arranged such that the incident angle at which the axial principal ray emitted from the center of the image display device is incident on the first surface is smaller than the angle of incidence on the first surface of a principal ray emitted from an end portion of the image display device which is closer to the observer's eyeball.

The reasons for adopting the above-described arrangements in the present invention, together with the functions thereof, will be explained below.

FIG. 1 is a sectional view illustrating a typical ocular optical system used in the image display apparatus according to the present invention. In FIG. 1, an ocular optical system 4 is a decentered prism. The decentered prism has a first surface 11 and a second surface 12, which are free-form surfaces tilted and decentered with respect to an observer's visual axis 2. A space formed by the first surface 11 and the second surface 12 is filled with a medium having a refractive index (refractive index for the spectral d-line) $n_d$=1.5254. The actual path of light rays is as follows: Light rays emitted from an image display device 5 enter the ocular optical system 4 while being refracted through the first surface 11, and are internally reflected by the second surface 12. The reflected rays exit from the ocular optical system 4 while being refracted through the first surface 11, and are projected into an observer's eyeball 3 with the observer's iris position or eyeball rolling center as an exit pupil 1.

First, a coordinate system used in the following description will be explained. Let us trace light rays by backward ray tracing from the pupil 1 toward the image display device 5. As shown in FIG. 1, an axis (visual axis) 2 is defined by a straight line along which an axial principal ray passing through the center of the exit pupil 1 and reaching the center of the image display device 5 travels after emanating from the pupil 1 until it intersects the first surface 11 of the ocular optical system 4. The visual axis 2 is defined as a Z-axis. An axis which perpendicularly intersects the Z-axis and which lies in a plane of decentration of each surface constituting the ocular optical system 4 is defined as a Y-axis. An axis which perpendicularly intersects both the visual axis 2 and the Y-axis is defined as an X-axis.

The following explanation will be made on the basis of backward ray tracing in which light rays are traced from the pupil 1 toward the image display device 5, unless otherwise specified.

In the ocular optical system according to the present invention, it is important that the first surface 11, which is a transmitting surface, should be convex toward the observer's eyeball 3. In the backward ray tracing from the observer's pupil 1 to the image display device 5, light rays emanating from the observer's pupil 1 enter the decentered prism, which is the ocular optical system 4, while being refracted through the first surface 11. If the first surface 11 is a convex surface, it has a positive power. Consequently, it is possible to minimize the height at which an extra-axial ray emanating from the pupil 1 at a large field angle is incident on the second surface 12, which is a reflecting surface. Accordingly, it is possible to ensure a wide field angle and, at the same time, to realize a compact and lightweight optical system. It also becomes possible to minimize the ray heights at the second surface 12 of subordinate rays in both a light beam on the visual axis and an extra-axial light beam. Thus, comatic aberrations produced by the reflecting surface are favorably corrected.

It is also important that the axial principal ray should form a V-shaped folded optical path in the decentered prism, and that the sectional configuration of the first surface 11 in a plane (YZ-plane) containing the V-shaped optical path should be arranged such that the incident angle at which the axial principal ray emitted from the center of the image display device 5 is incident on the first surface 11 is smaller than the angle of incidence on the first surface 11 of a principal ray emitted from an end portion of the image display device 5 which is closer to the observer's eyeball 3. By virtue of this arrangement, an optical path emanating from the observer's pupil 1 and entering the first surface 11 is reflected by the second surface 12 without being obstructed by the image display device 5, and the reflected optical path exits from the first surface 11 and reaches the image display device 5. Therefore, the image display device 5 need not be tilted with respect to the decentered prism 4. Accordingly, a relatively large image display device 5 can be disposed, and a wide field angle can be realized. Moreover, a compact and lightweight optical system can be realized.

By forming the first surface 11 from a free-form surface, comatic aberrations due to decentration can be minimized. This is because the first surface 11 is tilted with respect to the axial principal ray when light rays are refracted by the first surface 11, and thus it is possible to correct comatic aberrations due to decentration.

Further, in the present invention, the first surface 11 of the decentered prism 4 is a surface that faces the image display device 5. By using a free-form surface as a refracting surface close to the image display device 5, which is an image-forming device, image distortion can be corrected. The reason for this is that the refracting surface is disposed close to the image formation position in the backward ray tracing and therefore enables image distortion to be favorably corrected without aggravating other aberrations.

In the present invention, it is preferable that an entrance surface through which light rays emitted from the image display device 5 enter the ocular optical system 4 and an exit surface through which the light rays exit from the ocular optical system 4 should be formed from the identical surface. By doing so, the ocular optical system 4 can be formed in a compact structure at a reduced cost and adapted to provide a wide field angle. More specifically, because an entrance surface through which light rays emitted from the image display device 5 enter the ocular optical system 4 and an exit surface through which the light rays exit from the ocular optical system 4 are formed from a single surface, actions taking place at two surfaces are performed by one surface. Accordingly, the number of surfaces constituting an optical system is reduced, and thus the production cost can be lowered.

Further, because entrance and exit of light rays are performed simultaneously through a single surface, a wide field angle is attained, and it is possible to correct aberrations due to decentration effectively. In other words, by forming an entrance surface and an exit surface from a single surface, it becomes unnecessary to isolate an area on the entrance surface for an extra-axial light beam N on the positive side of the Y-axis from an area on the exit surface for an extra-axial light beam F on the negative side of the Y-axis. Therefore, it is possible to form a ray path in which the two light beams are superimposed on one another. Accordingly, a wide field angle can be realized. Further, because the angle of reflection at the second surface 12, which is a reflecting surface, can be reduced, it is possible to minimize aberrations due to decentration, particularly comatic aberrations, at the second surface 12.

In general, a spherical lens system used in a camera or the like is arranged such that aberrations produced by a spherical surface, e.g. spherical aberrations, comatic aberrations, and curvature of field, are corrected by another surface. Therefore, by using an aspherical surface as a constituent surface, various aberrations produced in the lens system can be reduced, and the number of surfaces constituting the lens system can be reduced. This is because the aberration correcting effect of an aspherical surface is very powerful, and a single aspherical surface produces an aberration correcting effect achieved with several spherical surfaces.

In an optical system using surfaces tilted or decentered with respect to the observer's visual axis as in the ocular optical system of the image display apparatus according to the present invention, aberrations due to decentration which cannot be corrected by a conventional rotationally symmetric aspherical surface are produced. Aberrations caused by decentration include comatic aberrations, astigmatism, image distortion, curvature of field, etc.

The feature of the present invention resides in that an ocular optical system which projects an image of an image display device into an observer's eyeball as an enlarged virtual image is formed from a decentered prism having two surfaces, and a free-form surface, which is a non-rotationally symmetric surface, is used to correct the above-described various aberrations due to decentration simultaneously and favorably.

Free-form surfaces used in the present invention are those which are defined, for example, by the following equation:

$$Z = C_2 + C_3Y + C_4X + C_5Y^2 + C_6YX + C_7X^2 + C_8Y^3 +$$
$$C_9Y^2X + C_{10}YX^2 + C_{11}X^3 + C_{12}Y^4 + C_{13}Y^3X +$$
$$C_{14}Y^2X^2 + C_{15}YX^3 + C_{16}X^4 + C_{17}Y^5 + C_{18}Y^4X +$$
$$C_{19}Y^3X^2 + C_{20}Y^2X^3 + C_{21}YX^4 + C_{22}X^5 + C_{23}Y^6 +$$
$$C_{24}Y^5X + C_{25}Y^4X^2 + C_{26}Y^3X^3 + C_{27}Y^2X^4 +$$
$$C_{28}YX^5 + C_{29}X^6 + C_{30}Y^7 + C_{31}Y^6X + C_{32}Y^5X^2 +$$
$$C_{33}Y^4X^3 + C_{34}Y^3X^4 + C_{35}Y^2X^5 + C_{36}YX^6 + C_{37}X^7$$
(a)

In the above Eq.(a), if the coefficients $C_4$, $C_6$, $C_9$, . . . of the terms with odd-numbered powers of X are set equal to zero (see Examples described later), a plane-symmetry free-form surface which is symmetric with respect to the X-axis direction is obtained. It should be noted that coefficients concerning aspherical surfaces which are not shown in the constituent parameters (shown later) are zero.

The decentration aberration correcting action of the decentered prism according to the present invention, which is formed by using the above-described free-form surface, will be described below.

First, a trapezoidal distortion due to decentration will be explained. Light rays emanating divergently from the eyeball in the backward ray tracing enter the decentered prism through the first surface and are reflected by the second surface, which is a decentered reflecting surface. At this time, Y-axis positive-side light rays and Y-axis negative-side light rays are reflected by the second surface with a difference in terms of divergence in the X-axis direction at the respective reflecting positions due to the difference in optical path length between them. Consequently, an image for observation is formed with a difference in size between an image lying in the positive direction of the Y-axis and an image in the negative direction of the Y-axis. That is, the horizontal length of the upper edge of the observation image is different from that of the lower edge thereof. Thus, the observation image has a trapezoidal distortion.

This distortion is produced by a decentered reflecting surface. Therefore, a similar trapezoidal distortion is produced not only by the second surface but also by any decentered reflecting surface in an ocular optical system. The distortion due to decentration can be corrected by using a free-form surface as a surface constituting the ocular optical system. This is because, as will be clear from a defining Eq.(a), a free-form surface has terms with odd-numbered powers of Y and terms with even-numbered powers of X, which enable the curvature to be changed in the X-axis direction as desired according to the sign (positive or negative) of the Y-axis.

An image formed by a decentered reflecting surface has a bow-shaped distortion. In this case, a free-form surface as expressed by the above Eq.(a) is used as a surface constituting the ocular optical system, thereby enabling the surface to be given a desired tilt in the Y-axis direction at a desired position on the X-axis in the above-described coordinate system. Thus, it is possible to control the tilt in the Y-axis direction according to the image height in the X-axis direction. Consequently, it becomes possible to favorably correct a distortion in which a horizontal line is observed as being a bow-shaped line.

Next, a rotationally symmetric image distortion will be explained. In an optical system which has a pupil lying away from a reflecting concave surface or a transmitting convex surface having a principal optical power in the optical system and which provides a wide field angle as in the ocular optical system according to the present invention, a barrel-shaped rotationally symmetric image distortion occurs to a considerable extent in the backward ray tracing from the pupil side. The occurrence of such an image distortion can be suppressed by changing the tilt of the peripheral portions of the reflecting surface or the exit surface.

Next, a rotationally asymmetric field curvature and the tilt of the image surface, which are caused by decentration, will be explained. In general, when light rays emanating from an infinitely distant object point are reflected by a concave mirror to form an image, the distance to the position of the image from the reflecting surface is a half of the radius of curvature of the reflecting surface. Accordingly, curvature of field which is convex toward the concave mirror and symmetric with respect to the optical axis is produced. In a case where the reflecting surface is decentered as in the present invention, light rays divergently emanating from the eyeball are reflected by the second surface, which is a decentered reflecting surface, and form an image surface tilted with respect to the direction of travel of the reflected light rays, that is, a rotationally asymmetric image surface. In this case, by using a free-form surface as a surface constituting the ocular optical system, it is possible to give desired curvatures in the X- and Y-axis directions relative to the positive and negative directions of the Y-axis. This is because, as will be clear from the defining Eq.(a), the free-form surface has terms with odd-numbered powers of Y which enable the curvature to be varied as desired according to the sign (positive or negative) of the Y-axis. This is effective in correcting a rotationally asymmetric field curvature, particularly the tilt of the image surface, produced by a decentered reflecting surface.

Next, a rotationally symmetric field curvature will be explained. In general, a reflecting mirror produces a curvature of field along the reflecting surface, as stated above. It is preferable in order to correct the field curvature to use a free-form surface, which enables a desired curvature to be given at any position.

Astigmatism can be corrected by appropriately changing the difference between the second-order differential or curvature in the X-axis direction and the second-order differential or curvature in the Y-axis direction.

Coma can be corrected by giving a desired tilt in the Y-axis direction at any point on the basis of the same idea as that for a bow-shaped image distortion described above.

In view of the productivity of optical parts, it is even more desirable to minimize the number of free-form surfaces used. Accordingly, it is preferable to use a plane surface or a spherical surface or a decentered rotationally symmetric surface as at least one of the surfaces constituting the ocular optical system. By doing so, it is possible to improve the productivity.

Further, in the present invention, the configuration of a surface constituting the ocular optical system is defined as a free-form surface which has no axis of rotational symmetry in nor out of the surface and which has only one plane of symmetry. More specifically, when a coordinate system is set as shown for example in FIG. 1, the constituent surface is formed as a free-form surface having a plane of symmetry lying in the YZ-plane, which is a plane containing the direction of decentration of the decentered surfaces. By doing so, the image formed on the image-formation plane in the backward ray tracing can be made symmetric with respect to the YZ-plane as a plane of symmetry. Thus, efforts required to make aberration correction can be reduced to a considerable extent.

It should be noted that the term "a reflecting surface having a reflecting action" as used in the present invention includes any reflecting surface having a reflective action, e.g. a totally reflecting surface, a mirror-coated surface, a semitransparent reflecting surface, etc.

When a free-form surface is used as at least one surface of a decentered prism forming an ocular optical system, it is possible to provide an ocular optical system having a wide field angle and favorably corrected for aberrations by satisfying the following conditions.

Among principal rays which emanate from the center of the pupil position and enter the image display device, six principal rays ① to ⑥ are determined by combinations of field angles in the directions X and Y, i.e. the field angle zero in the direction X, the maximum field angle in the direction X, the maximum field angle in the direction +Y (the upward direction as viewed in the image field), the field angle zero in the direction Y, and the maximum field angle in the direction −Y (the downward direction as viewed in the image field), as shown in Table 1 below:

TABLE 1

|  | Field angle zero in direction X | Maximum field angle in direction X |
|---|---|---|
| Maximum field angle in direction +Y | ① | ④ |
| Field angle zero in direction Y | ② | ⑤ |
| Maximum field angle in direction −Y | ③ | ⑥ |

As shown in Table 1: an axial principal ray in the center of the image field is defined as ②; a principal ray passing at the field angle zero in the direction X and at the maximum field angle in the direction +Y is defined as ①; a principal ray passing at the field angle zero in the direction X and at the maximum field angle in the direction −Y is defined by ③; a principal ray passing at the maximum field angle in the direction X and at the maximum field angle in the direction +Y is defined as ④; a principal ray passing at the maximum field angle in the direction X and at the field angle zero in the direction Y is defined as ⑤; and a principal ray passing at the maximum field angle in the direction X and at the maximum field angle in the direction −Y is defined as ⑥. An area where the principal rays ① to ⑥ intersect each particular surface is defined as an effective area. An equation which defines the configuration of each particular surface in the effective area [i.e. an expression in which the Z-axis is expressed as an axis of the surface, or an expression in which the surface is expressed in the form of Z=f(X,Y) on the assumption that the surface is not decentered] is solved to determine each of curvatures CY1 to CY6 of the surface in a direction parallel to the Y-axis, which corresponds to the direction of decentration of the surface, in a plane containing a line normal to the surface at each of positions where the principal rays ① to ⑥ strike the surface, and first-order differentials at the six positions are denoted by DY1 to DY6, respectively. The curvature of the surface in the direction of the X-axis, which perpendicularly intersects the Y-axis, in a plane containing a line normal to the surface at each of the six positions where the principal rays ① to ⑥ strike the surface is also determined. The curvatures in the X-axis direction at the six positions are denoted by CX1 to CX6, respectively, and first-order differentials at the six positions are denoted by DX1 to DX6, respectively. It should be noted that, as stated above, the curvatures and first-order differentials of each surface are computational values of the surface expressed in the form of Z=f(X,Y) in a state where the surface is not decentered.

Assuming that, in an exit region of the first surface through which light rays emitted from the image display device exit from the ocular optical system toward the observer after entering the ocular optical system and being reflected once therein, the curvature in the X-axis direction at an area through which the axial principal ray exits is CX2(1s), and the curvature in the Y-axis direction at that area is CY2(1s), it is desirable to satisfy both the following conditions:

$$0.005 < |CX2(1s)| < 0.1 \text{ (1/millimeter)} \qquad (1)$$

$$0.005 < |CY2(1s)| < 0.1 \text{ (1/millimeter)} \qquad (2)$$

The reason why the curvatures are expressed by absolute values is that they can be set to either positive or negative values depending upon the way of decentering the first surface (including the tilt angle). In Examples 1 to 3 and 6 (described later), both CX2(1s) and CY2(1s) have positive values. In Examples 4 and 5, both the curvatures have negative values.

The above-described conditions are necessary to ensure a positive power required at the exit surface of the first surface. If |CX2(1s)| or |CY2(1s)| is not larger than the lower limit, i.e. 0.005, a sufficient positive power cannot be given to light rays when they enter through the first surface in the backward ray tracing, and hence it becomes difficult to construct the ocular optical system in a compact form. If |CX2(1s)| or |CY2(1s)| is not smaller than the upper limit, i.e. 0.1, the positive power at the first surface becomes excessively strong, and it becomes difficult to ensure the required optical path length from the image display device to the observer's eyeball.

It is more desirable to satisfy both the following conditions:

$$0.01 < |CX2(1s)| < 0.05 \text{ (1/millimeter)} \qquad (3)$$

$$0.01 < |CY2(1s)| < 0.05 \text{ (1/millimeter)} \qquad (4)$$

The above conditions are necessary to enable the ocular optical system to provide a wide field angle. If |CX2(1s)| or |CY2(1s)| is not larger than the lower limit, i.e. 0.01, a positive power required for the first surface cannot be obtained, and a sufficiently wide field angle cannot be ensured. If |CX2(1s)| or |CY2(1s)| is not smaller than the upper limit, i.e. 0.05, aberrations produced by the first surface become large, and it becomes difficult to observe a clear image.

Next, it is desirable to satisfy the following condition:

$$0.05 < DY(1s) < 1.5 \qquad (5)$$

where DY(1s) represents DY1(1s)−DY3(1s), in which DY1(1s) and DY3(1s) are defined such that in an exit region of the first surface through which light rays emitted from the image display device exit from the ocular optical system toward the observer after entering the ocular optical system and being reflected once therein, the first-order differential in the Y-axis direction at an area through which the principal ray ① at the maximum field angle in the positive direction of the Y-axis in the YZ-plane exits is DY1(1s), and the first-order differential in the Y-axis direction at an area through which the principal ray at the maximum field angle in the negative direction of the Y-axis in the YZ-plane is DY3(1s).

The above is a condition for correcting comatic aberrations due to decentration by disposing the exit surface of the first surface such that the tilt in the Y-axis direction becomes larger toward the upper side of the Y-axis as viewed from the observer's side. If DY(1s) is not larger than the lower limit, i.e. 0.05, a sufficient tilt cannot be given to the upper and lower subordinate rays relative to the principal rays, and it becomes difficult to correct comatic aberrations. If DY(1s) is not smaller than the upper limit, i.e. 1.5, the change of the tilt becomes excessively large. Consequently, the entrance surface through which light rays emitted from the image display device enter undesirably interferes with the second surface, which is a reflecting surface, and it becomes difficult to construct an optical element serving as a decentered prism.

It is more desirable to satisfy the following condition:

$$0.1 < DY(1s) < 1.0 \tag{6}$$

In the case of a wide-field ocular optical system, comatic aberrations can be favorably corrected in the range defined by the condition (6).

Assuming that, in an entrance region of the first surface through which light rays emitted from the image display device enter the ocular optical system, the curvature in the X-axis direction at an area through which the principal ray at the maximum field angle in the positive direction of the Y-axis enters is CX1(1n), and the curvature in the X-axis direction at an area through which the principal ray at the maximum field angle in the negative direction of the Y-axis enters is CX3(1n), it is desirable to satisfy the following condition:

$$0.3 < CX1(1n)/CX3(1n) < 5 \tag{7}$$

This is a condition for correcting a trapezoidal distortion due to decentration by changing the curvature in the X-axis direction with respect to the axial and extra-axial rays in the entrance region of the first surface. If CX1(1n)/CX3(1n) is not larger than the lower limit, i.e. 0.3, the power at the peripheral portions becomes excessively small, and the image-forming performance at the peripheral portions of the image field is deteriorated. If CX1(1n)/CX3(1n) is not smaller than the upper limit, i.e. 5, the trapezoidal distortion is undesirably under-corrected.

It is more desirable to satisfy the following condition:

$$0.5 < CX1(1n)/CX3(1n) < 3 \tag{8}$$

Further, it is desirable to satisfy the following condition:

$$-2.0 < DY(1n) < 1.0 \tag{9}$$

where DY(1n) represents DY2(1n)–DY5(1n), in which DY2(1n) and DY5(1n) are defined such that in an entrance region of the first surface through which light rays emitted from the image display device enter the ocular optical system, the first-order differential in the Y-axis direction at an area through which the axial principal ray enters is DY2(1n), and the first-order differential in the Y-axis direction at an area through which the principal ray at the maximum field angle in the X-axis direction enters is DY5(1n).

The above is a condition for limiting the amount of change of tilt in the Y-axis direction. By satisfying the condition (9), it is possible to control the tilt in the Y-axis direction according to the image height in the X-axis direction, and the bow-shaped distortion can be corrected. If DY(1n) is not larger than the lower limit, i.e. –2.0, the distortion correcting effect weakens, resulting in an image field distorted at the peripheral portions thereof. If DY(1n) is not smaller than the upper limit, i.e. 1.0, the distortion is undesirably over-corrected, and an inverted distortion occurs.

It is more desirable to satisfy the following condition:

$$-1.0 < DY(1n) < 0.5 \tag{10}$$

This condition is particularly important in correcting a bow-shaped distortion in the case of a wide field angle.

Assuming that, in an entrance region of the first surface through which light rays emitted from the image display device enter the ocular optical system, the curvature in the Y-axis direction at an area through which the principal ray at the maximum field angle in the positive direction of the Y-axis enters is CY1(1n), and the curvature in the Y-axis direction at an area through which the principal ray at the maximum field angle in the negative direction of the Y-axis enters is CY3(1n), it is desirable to satisfy the following condition:

$$0.3 < CY1(1n)/CY3(1n) < 8 \tag{11}$$

This is a condition for correcting a rotationally asymmetric field curvature by changing the curvature in the Y-axis direction at an area in the entrance region of the first surface through which the principal ray at the maximum field angle in the positive direction of the Y-axis enters and the curvature in the Y-axis direction at an area in the entrance region of the first surface through which the principal ray at the maximum field angle in the negative direction of the Y-axis enters. If CY1(1n)/CY3(1n) is not larger than the lower limit, i.e. 0.3, the curvature difference between the positive and negative sides on the Y-axis becomes excessively large, resulting in an increase in the difference between the focal lengths at the two areas. Consequently, it becomes difficult to form a flat image surface. If CY1(1n)/CY3(1n) is not smaller than the upper limit, i.e. 8, the difference between the focal lengths also becomes large, making it difficult to form a flat image surface.

It is more desirable to satisfy the following condition:

$$0.5 < CY1(1n)/CY3(1n) < 5 \tag{12}$$

Assuming that in an entrance region of the first surface through which light rays emitted from the image display device enter the ocular optical system, the first-order differential in the Y-axis direction at an area through which the axial principal ray enters is DY2(1n), and in an exit region of the first surface through which the light rays exit from the ocular optical system toward the observer's eyeball, the first-order differential in the Y-axis direction at an area through which the axial principal ray exits is DY2(1s), it is desirable to satisfy the following condition:

$$0.1 < DY2(1n) - DY2(1s) < 1.5 \tag{13}$$

In the ocular optical system according to the present invention, the first surface serves as a surface through which light rays emitted from the image display device enter and also serves as a surface through which the light rays exit from the ocular optical system. Accordingly, incident rays and emergent rays pass through a common region of the first surface or through respective regions which are close to each other. The condition (13) defines continuity between the entrance and exit regions of the first surface. By satisfying the condition (13), it is possible to suppress the occurrence of aberrations in an area common to the entrance and exit regions or in an area where the two regions are close to each other. If DY2(1n)–DY2(1s) is not larger than the lower limit, i.e. 0.1, the difference in tilt between the entrance and exit regions becomes unfavorably small. Consequently, the entrance surface and the exit surface undesirably face in the same direction, and it becomes likely that the observer and the image display device will interfere with each other. If DY2(1n)–DY2(1s) is not smaller than the upper limit, i.e. 1.5, the entrance surface tilts toward the opposite side to the observer. Therefore, the entrance region of the first surface is likely to interfere with the second surface, which is a reflecting surface.

It is more desirable to satisfy the following condition:

$$0.1 < DY2(1n) - DY2(1s) < 1.0 \tag{14}$$

Next, conditions concerning the focal length of the optical system according to the present invention will be shown. In a case where a constituent surface is decentered and has a non-rotationally symmetric surface configuration having no axis of rotational symmetry, it is meaningless to calculate the focal length from the curvature and relative position of each surface. Therefore, the focal length is defined as follows.

The following description will be given by backward ray tracing from the observer's eyeball. The absolute value of the sine ($|\sin\theta|$) of an angle ($\theta$) formed between the axial principal ray and a marginal ray from the center of the image display device which passes through a point at a height H from the pupil center in the Y-axis direction is defined as a numerical aperture NA, and a value obtained by multiplying the reciprocal of NA and H together is defined as the focal length Fy in the YZ-plane. In this case, it is important that the focal length Fy of the ocular optical system should satisfy the following condition:

$$10 < Fy < 60 \text{ (millimeter)} \tag{15}$$

If Fy is not larger than the lower limit of the condition, i.e. 10, the ocular optical system may interfere with the observer's eyeball or the observer's face. If Fy is not smaller than the upper limit, i.e. 60, the overall size of the optical system becomes excessively large. In particular, when it is mounted on the observer's head, the image display apparatus may cause the observer to be fatigued. It should, however, be noted that the best value for this condition varies according to the size of the image display device used and the observation field angle. Therefore, it is important to take the best value according to the size of the image display device used and the observation field angle.

It is more desirable to satisfy the following condition:

$$15 < Fy < 55 \text{ (millimeter)} \tag{16}$$

The focal length in the XZ-plane will be similarly explained by backward ray tracing from the observer's eyeball. The absolute value of the sine ($|\sin\theta|$) of an angle ($\theta$) formed between the axial principal ray and a marginal ray from the center of the image display device which passes through a point at a height H from the pupil center in the X-axis direction is defined as a numerical aperture NA, and a value obtained by multiplying the reciprocal of NA and H together is defined as the focal length Fx in the XZ-plane. In this case, it is important that the focal length Fx of the ocular optical system should satisfy the following condition:

$$10 < Fx < 60 \text{ (millimeter)} \tag{17}$$

If Fx is not larger than the lower limit of the condition, i.e. 10, the ocular optical system may interfere with the observer's eyeball or the observer's face. If Fx is not smaller than the upper limit, i.e. 60, the overall size of the optical system becomes excessively large. In particular, when it is mounted on the observer's head, the image display apparatus may cause the observer to be fatigued. It should, however, be noted that the best value for this condition varies according to the size of the image display device used and the observation field angle. Therefore, it is important to take the best value according to the size of the image display device used and the observation field angle.

It is more desirable to satisfy the following condition:

$$15 < Fx < 55 \text{ (millimeter)} \tag{18}$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 6 of the image display apparatus according to the present invention will be described below.

Figure 1:
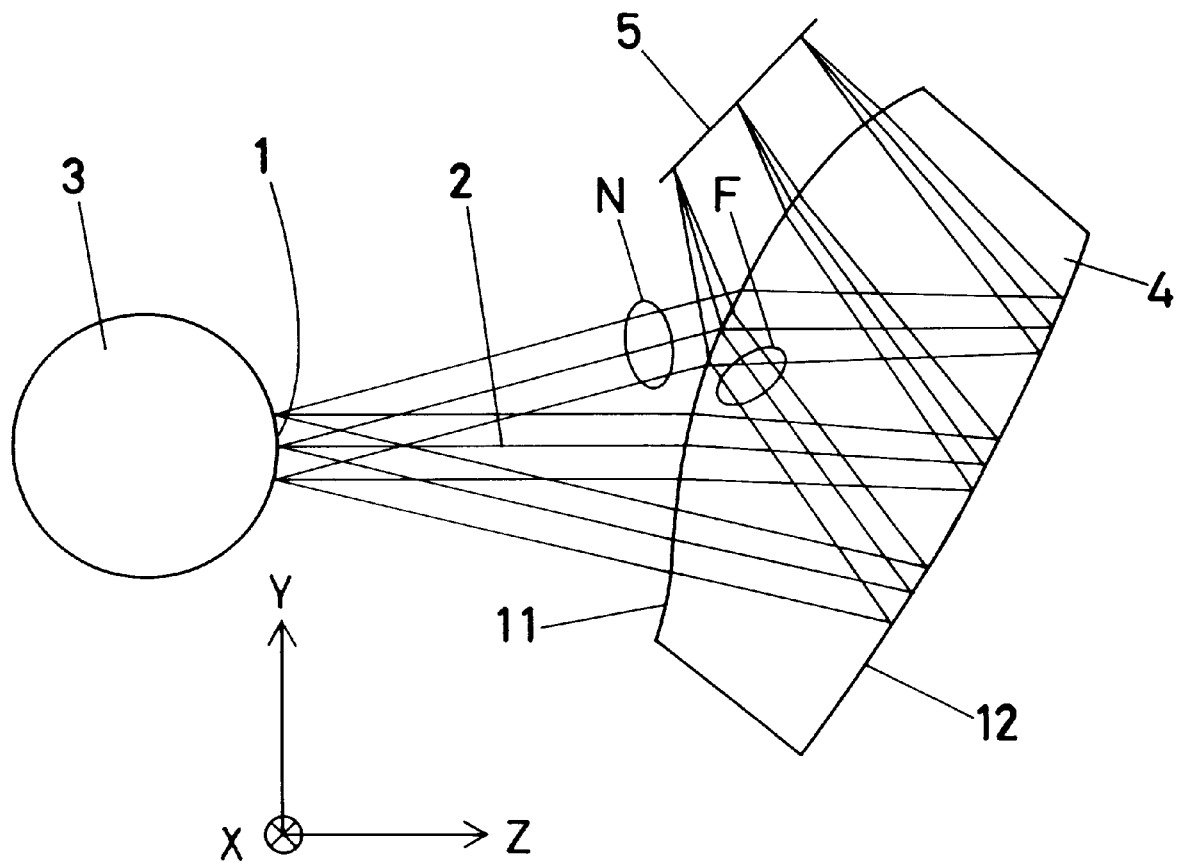
FIG. 1 is a sectional view of a typical ocular optical system used in the image display apparatus according to the present invention.
Figure 2:
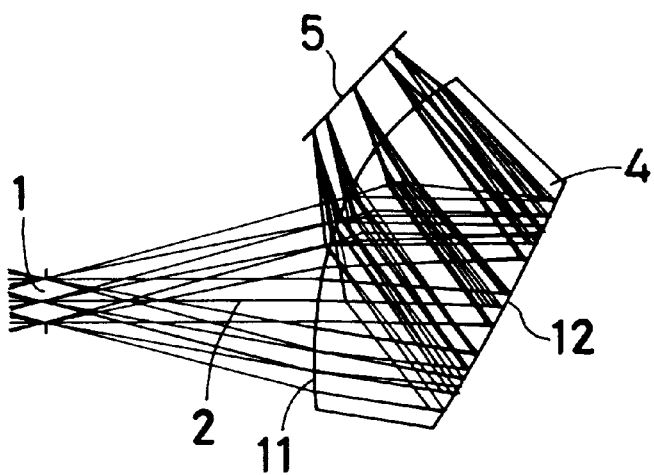
FIG. 2 is a sectional view of an optical system for a single eye of an image display apparatus which uses an ocular optical system according to Example 1 of the present invention.
Figure 3:
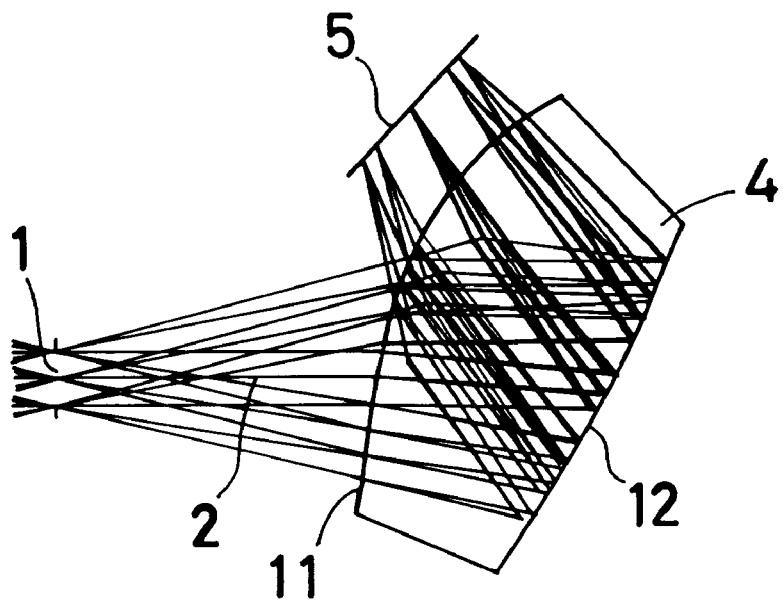
FIG. 3 is a sectional view of an optical system for a single eye of an image display apparatus which uses an ocular optical system according to Example 2 of the present invention.
Figure 4:
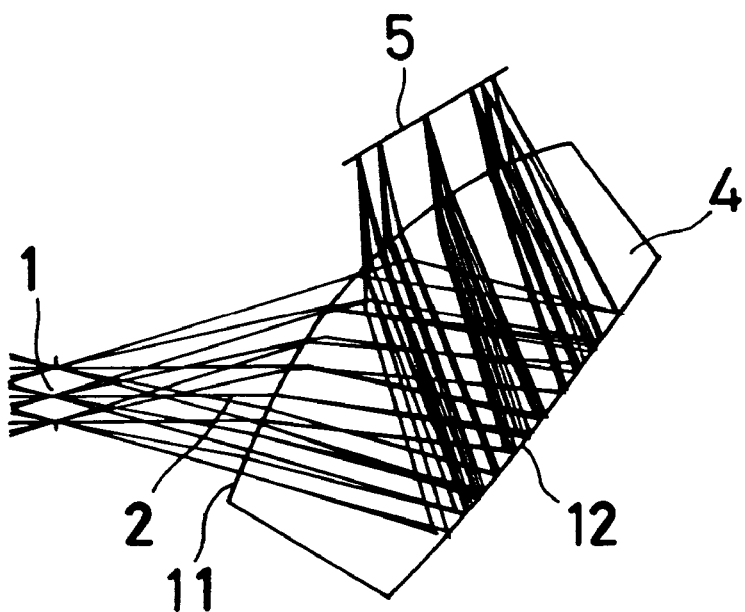
FIG. 4 is a sectional view of an optical system for a single eye of an image display apparatus which uses an ocular optical system according to Example 3 of the present invention.
Figure 5:
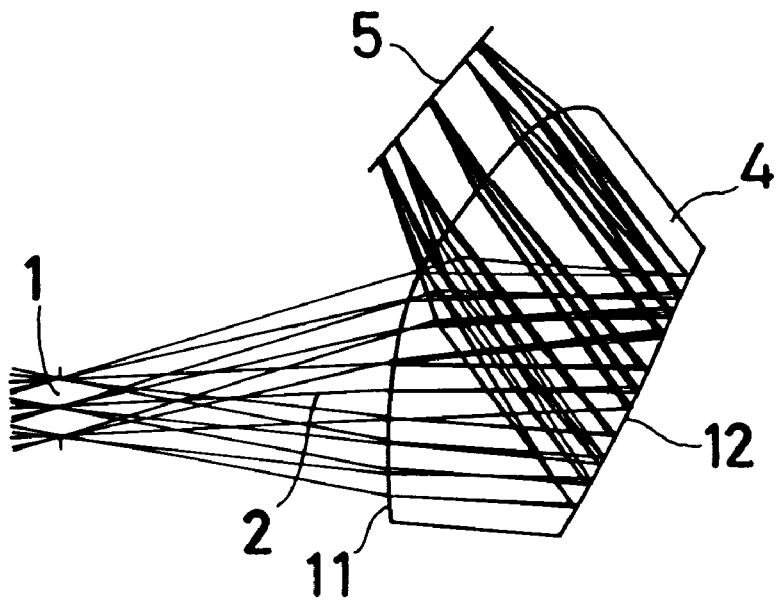
FIG. 5 is a sectional view of an optical system for a single eye of an image display apparatus which uses an ocular optical system according to Example 4 of the present invention.
Figure 6:
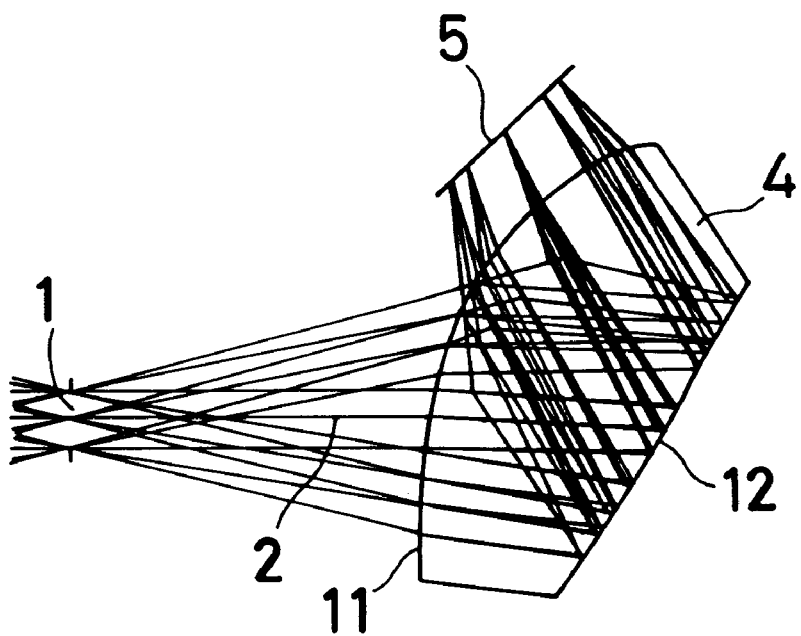
FIG. 6 is a sectional view of an optical system for a single eye of an image display apparatus which uses an ocular optical system according to Example 5 of the present invention.
Figure 7:
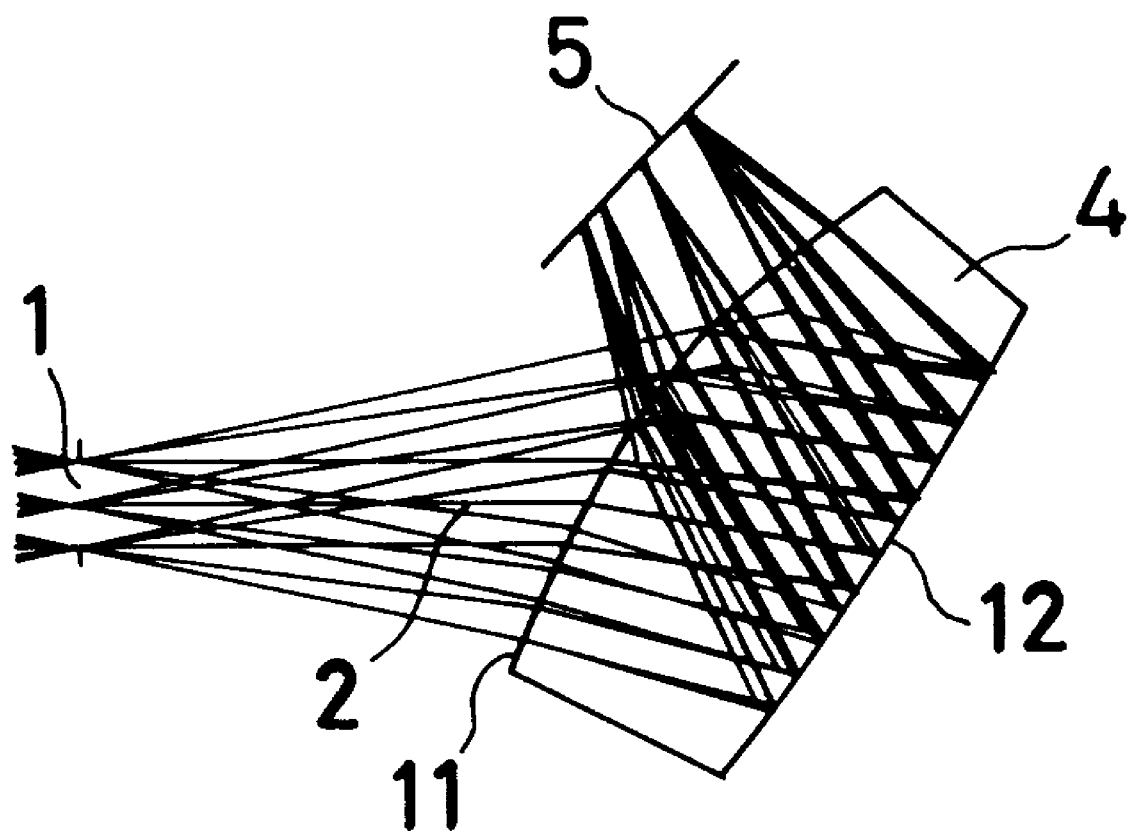
FIG. 7 is a sectional view of an optical system for a single eye of an image display apparatus which uses an ocular optical system according to Example 6 of the present invention.

In constituent parameters of each example (described later), as shown in FIG. 1, an exit pupil 1 of an ocular optical system 4 is defined as the origin of the optical system, and an optical axis 2 is defined by a light ray passing through both the center of the display area of an image display device 5 and the center (the origin) of the exit pupil 1. A Z-axis is taken in a direction in which light rays travel from the exit pupil 1 along the optical axis 2. A Y-axis is taken in a direction extending through the center of the exit pupil 1 at right angles to the Z-axis in a plane in which light rays are bent by the ocular optical system 4. An X-axis is taken in a direction extending through the center of the exit pupil 1 at right angles to both the Z- and Y-axes. A direction in which the Z-axis extends from the exit pupil 1 toward the ocular optical system 4 is defined as a positive direction of the Z-axis. A direction in which the Y-axis extends from the optical axis 2 toward the image display device 5 is defined as a positive direction of the Y-axis. A direction in which the X-axis constitutes a right-handed system in combination with the Z- and Y-axes is defined as a positive direction of the X-axis. It should be noted that ray tracing is carried out by backward ray tracing from the exit pupil 1 of the ocular optical system 4, which is defined as an object side, toward the image display device 5, which is defined as an image plane side.

Regarding decentered surfaces, each surface is given displacements (x, y and z, respectively) in the X-, Y- and Z-axis directions of the vertex position of the surface from the center of the pupil 1, which is the origin of the ocular optical system 4, and tilt angles (°) of the center axis of the surface [the Z-axis of the following Eq.(a) in regard to free-form surfaces] with respect to the X-, Y- and Z-axes $\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis. In addition, the surface separation, the refractive index of each medium, together with Abbe's number, are given according to the conventional method.

The configuration of a rotationally asymmetric surface is defined by the following equation. The Z-axis of the defining equation is the axis of the rotationally asymmetric surface.

$$Z = \Sigma_n \Sigma_m C_{nm} X^n Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry free-form surface (i.e. a rotationally asymmetric surface having only one plane of symmetry) is defined by the equation expressing a rotationally asymmetric surface, when symmetry produced by the plane of symmetry is to be obtained in the X-axis direction, all terms with odd-numbered powers of X are made zero (for example, the coefficients of the terms with odd-numbered powers of X are set equal to zero). To obtain symmetry produced by the plane of symmetry in the Y-axis direction, all terms with odd-numbered powers of Y are made zero (for example, the coefficients of the terms with odd-numbered powers of Y are set equal to zero).

Assuming that k=7 (polynomial of degree 7), for example, a plane-symmetry free-form surface which is symmetric with respect to the X-axis direction is expressed by an expanded form of the above equation as follows:

$$Z = C_2 + C_3 Y + C_4 X + C_5 Y^2 + C_6 YX + C_7 X^2 + C_8 Y^3 + \quad (a)$$

$$C_9 Y^2 X + C_{10} YX^2 + C_{11} X^3 + C_{12} Y^4 + C_{13} Y^3 X +$$
$$C_{14} Y^2 X^2 + C_{15} YX^3 + C_{16} X^4 + C_{17} Y^5 + C_{18} Y^4 X +$$
$$C_{19} Y^3 X^2 + C_{20} Y^2 X^3 + C_{21} YX^4 + C_{22} X^5 + C_{23} Y^6 +$$
$$C_{24} Y^5 X + C_{25} Y^4 X^2 + C_{26} Y^3 X^3 + C_{27} Y^2 X^4 +$$
$$C_{28} YX^5 + C_{29} X^6 + C_{30} Y^7 + C_{31} Y^6 X + C_{32} Y^5 X^2 +$$
$$C_{33} Y^4 X^3 + C_{34} Y^3 X^4 + C_{35} Y^2 X^5 + C_{36} YX^6 + C_{37} X^7$$

In the above defining Eq.(a), the coefficients $C_4$, $C_6$, $C_9$, . . . of the terms with odd-numbered powers of X are set equal to zero. It should be noted that coefficients concerning aspherical surfaces which are not shown in the constituent parameters (shown later) are zero.

Plane-symmetry free-form surfaces may also be defined by Zernike polynomials. That is, the configuration of a plane-symmetry free-form surface may be defined by the following Eq.(b). The Z-axis of the defining Eq.(b) is the axis of Zernike polynomial.

$$X = R \times \cos(A) \quad (b)$$

$$Y = R \times \sin(A)$$

$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A) \ldots$$

It should be noted that the plane-symmetry free-form surface in the above equation is expressed as a surface which is symmetric with respect to the X-axis direction In the above equation, $D_m$ (m is an integer of 2 or higher) are coefficients.

As an example of other expressions of surfaces usable in the present invention, the above defining equation $$(Z = \Sigma_n \Sigma_m C_{nm} X^n Y^{n-m})$$

may be expanded to express a surface which is symmetric with respect to the X-axis direction and in which k=7, as shown by the following Eq.(c) as in the case of Eq.(a):

$$Z = C_2 + C_3 Y + C_4 |X| + C_5 Y^2 + C_6 Y|X| + C_7 X^2 + C_8 Y^3 + \quad (c)$$

$$C_9 Y^2 |X| + C_{10} YX^2 + C_{11} |X^3| + C_{12} Y^4 + C_{13} Y^3 |X| +$$
$$C_{14} Y^2 X^2 + C_{15} Y|X^3| + C_{16} X^4 + C_{17} Y^5 + C_{18} Y^4 |X| +$$

-continued $$C_{19}Y^3X^2 + C_{20}Y^2|X^3| + C_{21}YX^4 + C_{22}|X^5| + C_{23}Y^6 +$$
$$C_{24}Y^5|X| + C_{25}Y^4X^2 + C_{26}Y^3|X^3| + C_{27}Y^2X^4 +$$
$$C_{28}Y|X^5| + C_{29}X^6 + C_{30}Y^7 + C_{31}Y^6|X| + C_{32}Y^5X^2 +$$
$$C_{33}Y^4|X^3| + C_{34}Y^3X^4 + C_{35}Y^2|X^5| + C_{36}YX^6 + C_{37}|X^7|$$

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

FIGS. 2 to 7 are sectional views of ocular optical. systems 4 according to Examples 1 to 6, taken along the YZ-plane containing the optical axis 2. As shown in these figures, in the ocular optical system 4 in each of Examples 1 to 6, display light from the image display device 5 enters the optical system 4 through the first surface 11, which is decentered transmitting surface facing both the image display device 5 and the exit pupil 1. The incident light is reflected by the second surface 12 and exits from the optical system 4 through the first surface 11, which is a transmitting surface. Then, the light enters an observer's pupil placed in the vicinity of the exit pupil 1, without forming an intermediate image, thus forming a display image on the retina of the observer's eye.

The observation field angles in Examples 1 to 6 are as follows: In Example 1, the horizontal field angle is 38 degrees, and the vertical field angle is 28.96 degrees; in Example 2, the horizontal field angle is 37 degrees, and the vertical field angle is 28.09 degrees; in Example 3, the horizontal field angle is 40 degrees, and the vertical field angle is 30.54 degrees; in Example 4, the horizontal field angle is 35 degrees, and the vertical field angle is 26.60 degrees; in Example 5, the horizontal field angle is 37 degrees, and the vertical field angle is 28.09 degrees; and in Example 6, the horizontal field angle is 30 degrees, and the vertical field angle is 22.72 degrees. In all Examples 1 to 6, the pupil diameter is 4 millimeters.

Constituent parameters in the foregoing Examples 1 to 6 are shown below. It should be noted that each free-form surface is denoted by "FFS".

Example 1

| Surface No. | Radius of curvature | Surface separation | Displacement and tilt | Refractive index | Abbe's No. |
|---|---|---|---|---|---|
| 1 | ∞ (Puple) | | | | |
| 2 | FFS [1] | | (1) | 1.5254 | 56.2 |
| 3 | FFS [2] | | (2) | 1.5254 | 56.2 |
| 4 | FFS [1] | | (1) | | |
| Image plane | ∞ | | (3) | | |

FFS [1]

| | | | | | |
|---|---|---|---|---|---|
| $C_5$ | $1.2405 \times 10^{-2}$ | $C_7$ | $1.3403 \times 10^{-2}$ | $C_8$ | $4.1630 \times 10^{-4}$ |
| $C_{10}$ | $6.5863 \times 10^{-4}$ | $C_{12}$ | $-3.1267 \times 10^{-5}$ | $C_{14}$ | $-8.3796 \times 10^{-6}$ |
| $C_{16}$ | $1.0604 \times 10^{-5}$ | $C_{17}$ | $1.0099 \times 10^{-6}$ | $C_{19}$ | $1.2040 \times 10^{-6}$ |
| $C_{21}$ | $-4.9466 \times 10^{-7}$ | | | | |

FFS [2]

| | | | | | |
|---|---|---|---|---|---|
| $C_5$ | $-5.8618 \times 10^{-2}$ | $C_7$ | $2.2493 \times 10^{-2}$ | $C_8$ | $-2.9641 \times 10^{-3}$ |
| $C_{10}$ | $2.2275 \times 10^{-3}$ | $C_{12}$ | $-7.8500 \times 10^{-5}$ | $C_{14}$ | $4.8009 \times 10^{-5}$ |
| $C_{16}$ | $5.5518 \times 10^{-6}$ | $C_{17}$ | $-7.7991 \times 10^{-7}$ | $C_{19}$ | $1.7951 \times 10^{-7}$ |
| $C_{21}$ | $-2.5699 \times 10^{-7}$ | | | | |

Displacement and tilt (1)

| x | 0.000 | y | −5.626 | z | 27.000 |
|---|---|---|---|---|---|
| α | 0.51 | β | 0.00 | γ | 0.00 |

Displacement and tilt (2)

| x | 0.000 | y | 26.825 | z | 55.056 |
|---|---|---|---|---|---|
| α | 8.98 | β | 0.00 | γ | 0.00 |

Displacement and tilt (3)

| x | 0.000 | y | 20.331 | z | 30.993 |
|---|---|---|---|---|---|
| α | −45.00 | β | 0.00 | γ | 0.00 |

Example 2

| Surface No. | Radius of curvature | Surface separation | Displacement and tilt | Refractive index | Abbe's No. |
|---|---|---|---|---|---|
| 1 | ∞ (Puple) | | | | |
| 2 | FFS [1] | | (1) | 1.5254 | 56.2 |
| 3 | FFS [2] | | (2) | 1.5254 | 56.2 |
| 4 | FFS [1] | | (1) | | |
| Image plane | ∞ | | (3) | | |

FFS [1]

| | | | | | |
|---|---|---|---|---|---|
| $C_5$ | $1.1128 \times 10^{-2}$ | $C_7$ | $1.3993 \times 10^{-2}$ | $C_8$ | $9.6645 \times 10^{-4}$ |
| $C_{10}$ | $1.2235 \times 10^{-3}$ | $C_{12}$ | $-6.8248 \times 10^{-5}$ | $C_{14}$ | $-3.2220 \times 10^{-5}$ |
| $C_{16}$ | $1.0344 \times 10^{-5}$ | $C_{17}$ | $1.5998 \times 10^{-6}$ | $C_{19}$ | $1.3888 \times 10^{-6}$ |
| $C_{21}$ | $-7.4398 \times 10^{-7}$ | | | | |

FFS [2]

| | | | | | |
|---|---|---|---|---|---|
| $C_5$ | $-1.0561 \times 10^{-1}$ | $C_7$ | $2.8750 \times 10^{-2}$ | $C_8$ | $-3.0206 \times 10^{-3}$ |
| $C_{10}$ | $2.6710 \times 10^{-3}$ | $C_{12}$ | $-1.7050 \times 10^{-5}$ | $C_{14}$ | $2.0491 \times 10^{-5}$ |
| $C_{16}$ | $2.7370 \times 10^{-5}$ | $C_{17}$ | $8.3324 \times 10^{-7}$ | $C_{19}$ | $-9.2625 \times 10^{-7}$ |
| $C_{21}$ | $2.3689 \times 10^{-7}$ | | | | |

Displacement and tilt (1)

| x | 0.000 | y | −2.530 | z | 25.375 |
|---|---|---|---|---|---|
| α | −7.36 | β | 0.00 | γ | 0.00 |

Displacement and tilt (2)

| x | 0.000 | y | 26.272 | z | 52.420 |
|---|---|---|---|---|---|
| α | 31.89 | β | 0.00 | γ | 0.00 |

Displacement and tilt (3)

| x | 0.000 | y | 20.455 | z | 28.974 |
|---|---|---|---|---|---|
| α | −45.00 | β | 0.00 | γ | 0.00 |

Example 3

| Surface No. | Radius of curvature | Surface separation | Displacement and tilt | Refractive index | Abbe's No. |
|---|---|---|---|---|---|
| 1 | ∞ (Puple) | | | | |
| 2 | FFS [1] | | (1) | 1.5254 | 56.2 |
| 3 | FFS [2] | | (2) | 1.5254 | 56.2 |
| 4 | FFS [1] | | (1) | | |
| Image plane | ∞ | | (3) | | |

FFS [1]

| | | | | | |
|---|---|---|---|---|---|
| $C_5$ | $1.0024 \times 10^{-2}$ | $C_7$ | $1.1570 \times 10^{-2}$ | $C_8$ | $5.1148 \times 10^{-4}$ |
| $C_{10}$ | $1.3882 \times 10^{-3}$ | $C_{12}$ | $-2.9982 \times 10^{-5}$ | $C_{14}$ | $-8.4299 \times 10^{-5}$ |

-continued

| | | | | | | |
|---|---|---|---|---|---|---|
| $C_{16}$ | $-1.5692 \times 10^{-5}$ | $C_{17}$ | $5.9671 \times 10^{-7}$ | $C_{19}$ | $1.9443 \times 10^{-6}$ | |
| $C_{21}$ | $8.8672 \times 10^{-7}$ | | | | | |

FFS [2]

| | | | | | | |
|---|---|---|---|---|---|---|
| $C_5$ | $-3.6639 \times 10^{-2}$ | $C_7$ | $2.1743 \times 10^{-2}$ | $C_8$ | $4.3401 \times 10^{-4}$ | |
| $C_{10}$ | $6.6533 \times 10^{-4}$ | $C_{12}$ | $3.4232 \times 10^{-5}$ | $C_{14}$ | $-9.5469 \times 10^{-6}$ | |
| $C_{16}$ | $2.2945 \times 10^{-5}$ | $C_{17}$ | $4.6794 \times 10^{-7}$ | $C_{19}$ | $-7.7470 \times 10^{-8}$ | |
| $C_{21}$ | $4.7728 \times 10^{-7}$ | | | | | |

Displacement and tilt (1)

| x | 0.000 | y | −2.982 | z | 16.340 |
|---|---|---|---|---|---|
| α | −25.03 | β | 0.00 | γ | 0.00 |

Displacement and tilt (2)

| x | 0.000 | y | 39.169 | z | 59.871 |
|---|---|---|---|---|---|
| α | 18.98 | β | 0.00 | γ | 0.00 |

Displacement and tilt (3)

| x | 0.000 | y | 21.353 | z | 30.634 |
|---|---|---|---|---|---|
| α | −61.22 | β | 0.00 | γ | 0.00 |

Example 4

| Surface No. | Radius of curvature | Surface separation | Displacement and tilt | Refractive index | Abbe's No. |
|---|---|---|---|---|---|
| 1 | ∞ (Puple) | | | | |
| 2 | FFS [1] | | (1) | 1.5254 | 56.2 |
| 3 | FFS [2] | | (2) | 1.5254 | 56.2 |
| 4 | FFS [1] | | (1) | | |
| Image plane | ∞ | | (3) | | |

FFS [1]

| | | | | | | |
|---|---|---|---|---|---|---|
| $C_5$ | $-6.6362 \times 10^{-3}$ | $C_7$ | $-1.7294 \times 10^{-2}$ | $C_8$ | $-1.3829 \times 10^{-3}$ | |
| $C_{10}$ | $3.4389 \times 10^{-4}$ | $C_{12}$ | $-3.5969 \times 10^{-5}$ | $C_{14}$ | $-2.1653 \times 10^{-4}$ | |
| $C_{16}$ | $-1.9129 \times 10^{-5}$ | $C_{17}$ | $6.8767 \times 10^{-6}$ | $C_{19}$ | $9.9001 \times 10^{-5}$ | |
| $C_{21}$ | $-1.1872 \times 10^{-6}$ | $C_{23}$ | $-2.1538 \times 10^{-7}$ | $C_{25}$ | $6.2014 \times 10^{-7}$ | |
| $C_{27}$ | $8.0052 \times 10^{-7}$ | $C_{29}$ | $1.3631 \times 10^{-7}$ | $C_{30}$ | $1.4057 \times 10^{-9}$ | |
| $C_{32}$ | $-3.4386 \times 10^{-8}$ | $C_{34}$ | $-4.1216 \times 10^{-8}$ | $C_{36}$ | $-1.5858 \times 10^{-8}$ | |

FFS [2]

| | | | | | | |
|---|---|---|---|---|---|---|
| $C_5$ | $-3.2470 \times 10^{-3}$ | $C_7$ | $-2.9474 \times 10^{-3}$ | $C_8$ | $1.7741 \times 10^{-4}$ | |
| $C_{10}$ | $2.2878 \times 10^{-4}$ | $C_{12}$ | $2.2511 \times 10^{-5}$ | $C_{14}$ | $1.4450 \times 10^{-5}$ | |
| $C_{16}$ | $6.3829 \times 10^{-6}$ | $C_{17}$ | $2.1353 \times 10^{-6}$ | $C_{19}$ | $3.9611 \times 10^{-8}$ | |
| $C_{21}$ | $2.3359 \times 10^{-7}$ | $C_{23}$ | $1.2221 \times 10^{-7}$ | $C_{25}$ | $-3.9700 \times 10^{-8}$ | |
| $C_{27}$ | $-5.8896 \times 10^{-8}$ | $C_{29}$ | $-2.0059 \times 10^{-8}$ | $C_{30}$ | $2.3943 \times 10^{-9}$ | |
| $C_{32}$ | $-6.0703 \times 10^{-9}$ | $C_{34}$ | $-6.8801 \times 10^{-9}$ | $C_{36}$ | $-4.5144 \times 10^{-9}$ | |

Displacement and tilt (1)

| x | 0.000 | y | 12.395 | z | 31.540 |
|---|---|---|---|---|---|
| α | −222.13 | β | 0.00 | γ | 0.00 |

Displacement and tilt (2)

| x | 0.000 | y | 1.173 | z | 46.088 |
|---|---|---|---|---|---|
| α | −27.78 | β | 0.00 | γ | 0.00 |

Displacement and tilt (3)

| x | 0.000 | y | 21.267 | z | 30.098 |
|---|---|---|---|---|---|
| α | −45.00 | β | 0.00 | γ | 0.00 |

Example 5

| Surface No. | Radius of curvature | Surface separation | Displacement and tilt | Refractive index | Abbe's No. |
|---|---|---|---|---|---|
| 1 | ∞ (Puple) | | | | |
| 2 | FFS [1] | | (1) | 1.5254 | 56.2 |
| 3 | FFS [2] | | (2) | 1.5254 | 56.2 |
| 4 | FFS [1] | | (1) | | |
| Image plane | ∞ | | (3) | | |

FFS [1]

| | | | | | | |
|---|---|---|---|---|---|---|
| $C_5$ | $-1.0860 \times 10^{-2}$ | $C_7$ | $-2.6371 \times 10^{-2}$ | $C_8$ | $2.6328 \times 10^{-4}$ | |
| $C_{10}$ | $8.4152 \times 10^{-4}$ | $C_{12}$ | $-8.8650 \times 10^{-5}$ | $C_{14}$ | $-1.4761 \times 10^{-4}$ | |
| $C_{16}$ | $1.9082 \times 10^{-5}$ | $C_{17}$ | $1.2922 \times 10^{-6}$ | $C_{19}$ | $3.5899 \times 10^{-7}$ | |
| $C_{21}$ | $-3.3554 \times 10^{-6}$ | $C_{23}$ | $1.4201 \times 10^{-7}$ | $C_{25}$ | $8.2364 \times 10^{-7}$ | |
| $C_{27}$ | $6.7789 \times 10^{-7}$ | $C_{29}$ | $4.9587 \times 10^{-9}$ | $C_{30}$ | $-3.8546 \times 10^{-9}$ | |
| $C_{32}$ | $-2.7596 \times 10^{-8}$ | $C_{34}$ | $-3.4111 \times 10^{-8}$ | $C_{36}$ | $-5.9102 \times 10^{-9}$ | |

FFS [2]

| | | | | | | |
|---|---|---|---|---|---|---|
| $C_5$ | $-1.3991 \times 10^{-3}$ | $C_7$ | $-1.7680 \times 10^{-3}$ | $C_8$ | $3.7253 \times 10^{-4}$ | |
| $C_{10}$ | $5.5146 \times 10^{-4}$ | $C_{12}$ | $2.0939 \times 10^{-5}$ | $C_{14}$ | $2.7562 \times 10^{-5}$ | |
| $C_{16}$ | $5.7204 \times 10^{-6}$ | $C_{17}$ | $2.9466 \times 10^{-7}$ | $C_{19}$ | $-6.6743 \times 10^{-7}$ | |
| $C_{21}$ | $-1.3320 \times 10^{-6}$ | $C_{23}$ | $-2.9947 \times 10^{-8}$ | $C_{25}$ | $-1.2696 \times 10^{-7}$ | |
| $C_{27}$ | $-1.1341 \times 10^{-7}$ | $C_{29}$ | $1.0064 \times 10^{-8}$ | $C_{30}$ | $-1.3109 \times 10^{-9}$ | |
| $C_{32}$ | $-5.9950 \times 10^{-8}$ | $C_{34}$ | $-6.3592 \times 10^{-9}$ | $C_{36}$ | $-1.6653 \times 10^{-9}$ | |

Displacement and tilt (1)

| x | 0.000 | y | 14.447 | z | 35.933 |
|---|---|---|---|---|---|
| α | −226.34 | β | 0.00 | γ | 0.00 |

Displacement and tilt (2)

| x | 0.000 | y | 3.319 | z | 48.869 |
|---|---|---|---|---|---|
| α | −29.76 | β | 0.00 | γ | 0.00 |

Displacement and tilt (3)

| x | 0.000 | y | 21.160 | z | 34.167 |
|---|---|---|---|---|---|
| α | −49.02 | β | 0.00 | γ | 0.00 |

Example 6

| Surface No. | Radius of curvature | Surface separation | Displacement and tilt | Refractive index | Abbe's No. |
|---|---|---|---|---|---|
| 1 | ∞ (Puple) | | | | |
| 2 | FFS [1] | | (1) | 1.5254 | 56.2 |
| 3 | FFS [2] | | (2) | 1.5254 | 56.2 |
| 4 | FFS [1] | | (1) | | |
| Image plane | ∞ | | (3) | | |

FFS [1]

| | | | | | | |
|---|---|---|---|---|---|---|
| $C_5$ | $7.7189 \times 10^{-3}$ | $C_7$ | $1.0198 \times 10^{-2}$ | $C_8$ | $5.7683 \times 10^{-4}$ | |
| $C_{10}$ | $1.1510 \times 10^{-3}$ | $C_{12}$ | $-2.2294 \times 10^{-5}$ | $C_{14}$ | $-4.1524 \times 10^{-5}$ | |
| $C_{16}$ | $-1.5340 \times 10^{-5}$ | $C_{17}$ | $2.7004 \times 10^{-7}$ | $C_{19}$ | $7.5465 \times 10^{-7}$ | |
| $C_{21}$ | $2.4757 \times 10^{-7}$ | | | | | |

FFS [2]

| | | | | | | |
|---|---|---|---|---|---|---|
| $C_5$ | $-9.0127 \times 10^{-2}$ | $C_7$ | $9.1936 \times 10^{-3}$ | $C_8$ | $-2.4718 \times 10^{-3}$ | |
| $C_{10}$ | $1.2366 \times 10^{-3}$ | $C_{12}$ | $-1.9286 \times 10^{-5}$ | $C_{14}$ | $2.8754 \times 10^{-5}$ | |
| $C_{16}$ | $7.4347 \times 10^{-6}$ | $C_{17}$ | $6.2948 \times 10^{-7}$ | $C_{19}$ | $8.2054 \times 10^{-7}$ | |
| $C_{21}$ | $3.5239 \times 10^{-7}$ | | | | | |

Displacement and tilt (1)

| x | 0.000 | y | −4.209 | z | 23.645 |
|---|---|---|---|---|---|
| α | −23.81 | β | 0.00 | γ | 0.00 |

-continued

|   | Displacement and tilt (2) | | | | |
|---|---|---|---|---|---|
| x | 0.000 | y | 23.811 | z | 50.313 |
| α | 26.24 | β | 0.00 | γ | 0.00 |
|   | Displacement and tilt (3) | | | | |
| x | 0.000 | y | 16.392 | z | 28.813 |
| α | −45.07 | β | 0.00 | γ | 0.00 |

Values of parameters concerning the conditions (1) to (18) in each of Examples 1 to 6 of the present invention are shown in the table below.

| Conditions | Ex. 1 | Ex. 2 | Ex. 3 | Ex. 4 | Ex. 5 | Ex. 6 |
|---|---|---|---|---|---|---|
| (1), (3) | 0.0337 | 0.0338 | 0.0306 | −0.0379 | −0.0391 | 0.0294 |
| (2), (4) | 0.0294 | 0.0320 | 0.0265 | −0.0316 | −0.0283 | 0.0259 |
| (5), (6) | 0.4422 | 0.3381 | 0.3063 | 0.6204 | 0.6759 | 0.3145 |
| (7), (8) | 1.1844 | 1.3163 | 1.0451 | 2.1917 | 1.3955 | 1.1423 |
| (9), (10) | 0.0801 | −0.0163 | 0.0362 | −0.0830 | −0.0157 | 0.0019 |
| (11), (12) | 1.5518 | 0.5474 | 1.0378 | 1.5687 | 3.6770 | 1.7366 |
| (13), (14) | 0.6915 | 0.4902 | 0.5500 | 0.6650 | 0.7561 | 0.3039 |
| (15), (16) | 20.6864 | 23.1895 | 22.4070 | 25.6562 | 21.6081 | 19.5526 |
| (17), (18) | 21.6910 | 22.1273 | 24.5230 | 24.3108 | 22.1278 | 20.4165 |

Although the ocular optical systems in the above examples use free-form surfaces defined by the above defining equation (a), curved surfaces defined by any defining equation can be used in the present invention. No matter which defining equation is used, an ocular optical system which is favorably corrected for aberrations can be obtained by satisfying any or some of the conditions shown in the present invention.

It should be noted that conditional expressions which are used in conventional coaxial systems, e.g. those for the curvature of a surface defined on the basis of the center of a coordinate system for defining a surface in which decentration is ignored, and those for the focal length of a surface, are meaningless in a case where each surface is decentered to a considerable extent as in the present invention.

Figure 8:
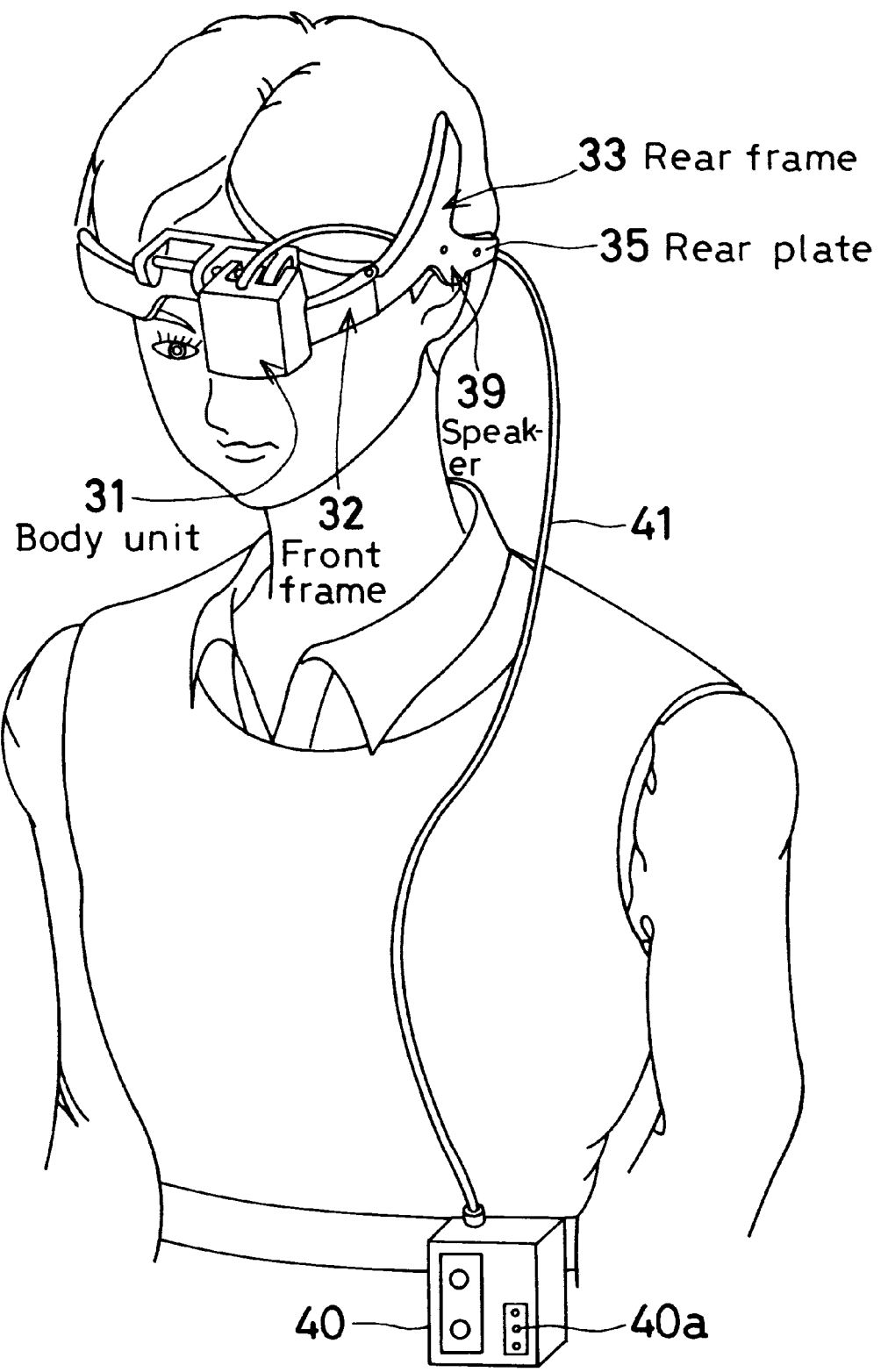
FIG. 8 is a diagram showing the whole arrangement of an example of an image display apparatus according to the present invention which is arranged for a single eye.
Figure 9:
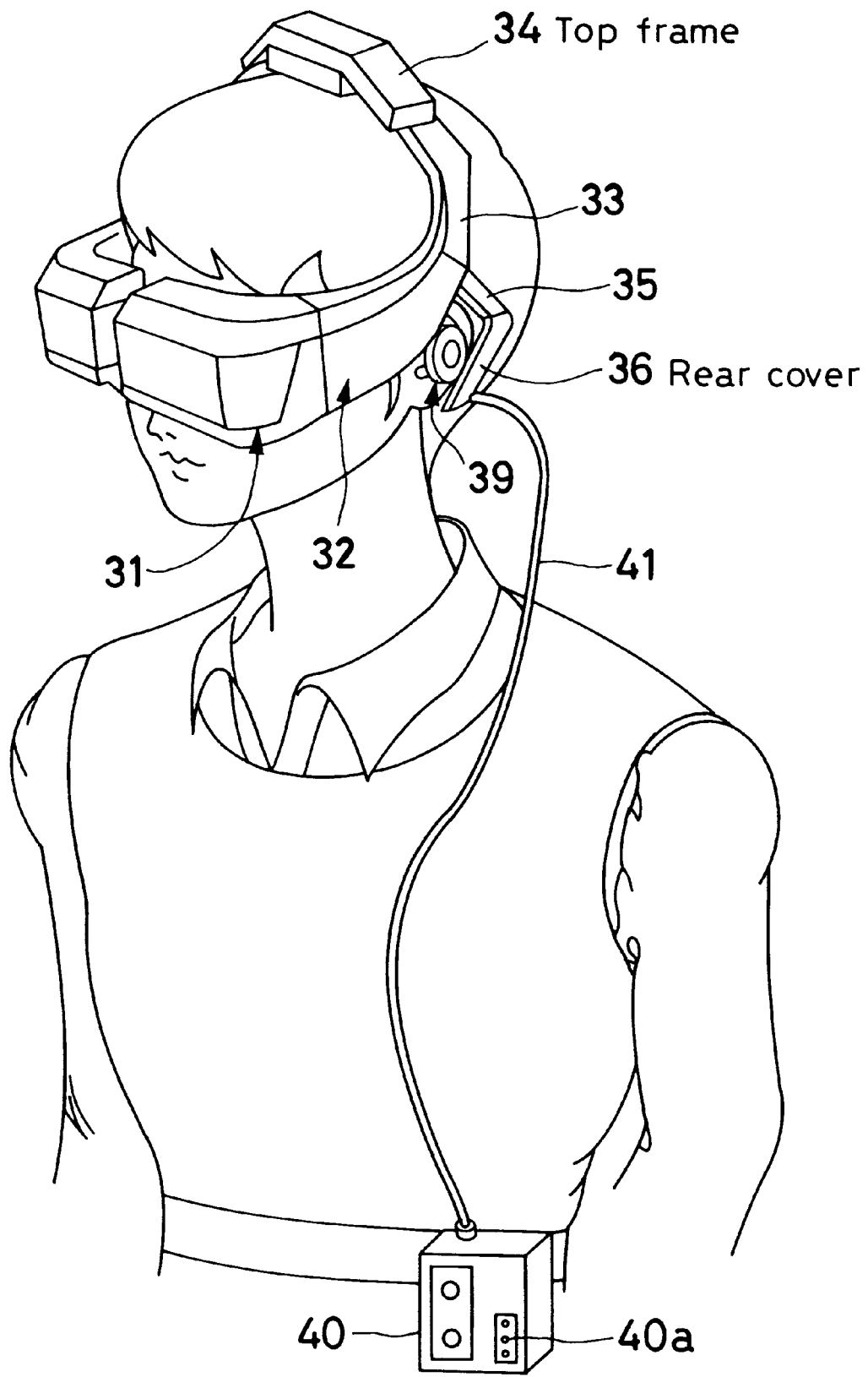
FIG. 9 is a diagram showing the whole arrangement of an example of an image display apparatus according to the present invention which is arranged for both eyes.
Figure 10:
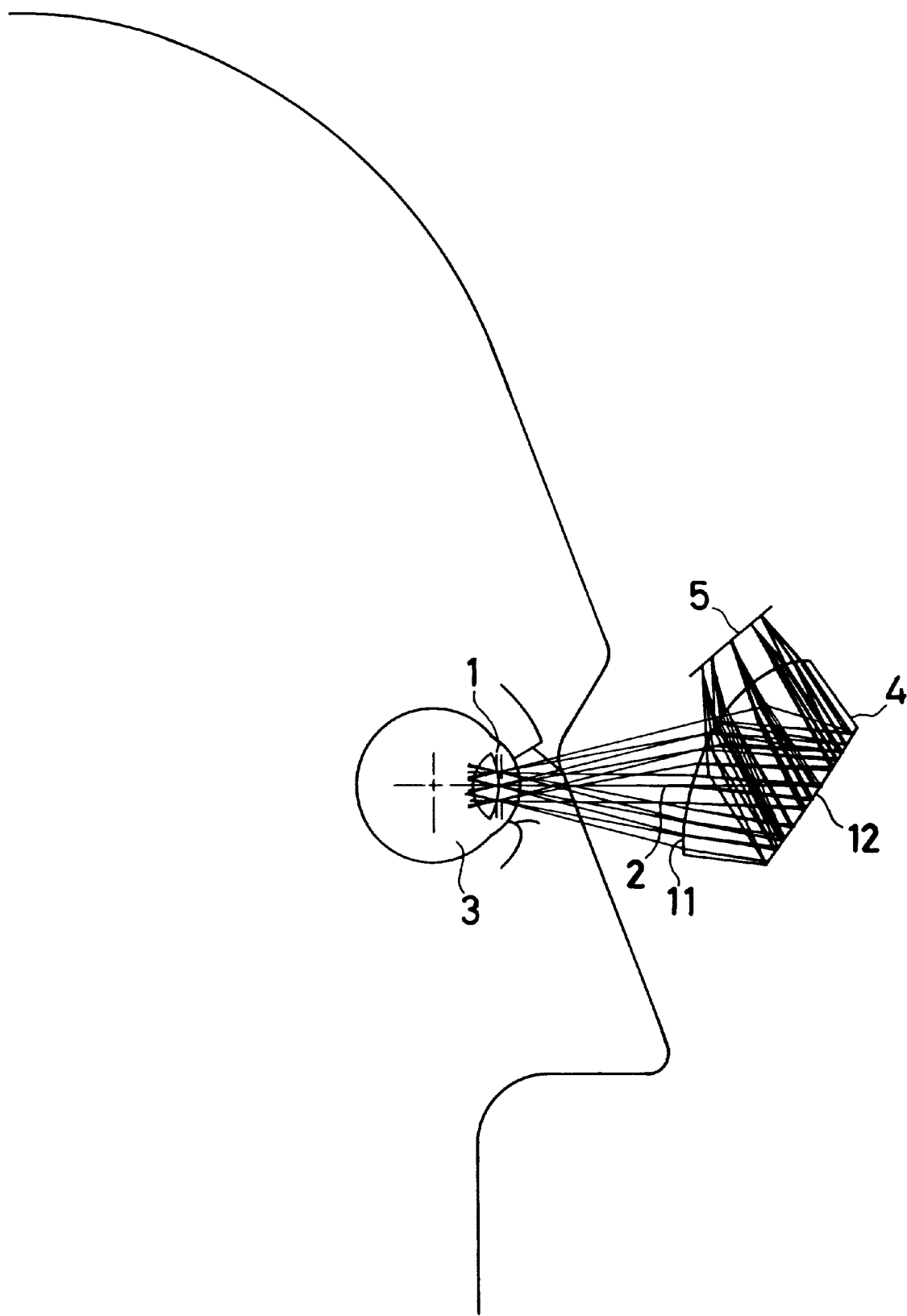
FIG. 10 is a diagram showing the disposition of an ocular optical system with respect to an observer's eye in the case of the arrangements shown in FIGS. 8 and 9.

Incidentally, the foregoing image display apparatus may be arranged either for a single eye or for both eyes. FIG. 8 shows an image display apparatus arranged for a single eye (in this case, the apparatus is designed for the left eye), and FIG. 9 shows an image display apparatus arranged for both eyes. FIG. 10 is a diagram showing the disposition of the ocular optical system 4 with respect to an eye of an observer in the case of an image display apparatus designed for a single eye or both eyes.

In FIGS. 8 and 9, reference numeral 31 denotes a display apparatus body unit. In the case of FIG. 8, the display apparatus body unit 31 is supported by a support member on the observer's head such that the display apparatus body unit 31 is held in front of the observer's left eye. In the case of FIG. 9, the display apparatus body unit 31 is supported by a support member on the observer's head such that the display apparatus body unit 31 is held in front of both the observer's eyes. The support member has a pair of left and right front frames 32 each joined at one end thereof to the display apparatus body unit 31. The left and right front frames 32 extend from the observer's temples to the upper portions of his/her ears, respectively. A pair of left and right rear frames 33 are joined to the other ends of the left and right front frames 32, respectively, and extend over the left and right side portions of the observer's head. In the case of FIG. 9, the support member further has a top frame 34 joined at both ends thereof to the other ends of the left and right rear frames 33, respectively, such that the top frame 34 lies over the top of the observer's head.

A rear plate 35 is joined to one front frame 32 near the joint to the rear frame 33. The rear plate 35 is formed from an elastic member, e.g. a metal leaf spring. In the case of FIG. 9, a rear cover 36, which constitutes a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. In the case of FIG. 9, the cable 41 extends through the top frame 34, the rear frames 33, the front frames 32 and the rear plate 35 and projects to the outside from the rear end of the rear cover 36. In the case of FIG. 8, the cable 41 projects from the rear end of the rear plate 35. The cable 41 is connected to a video replaying unit 40. It should be noted that reference numeral 40a in the figures denotes a switch and volume control part of the video replaying unit 40.

The cable 41 may have a jack and plug arrangement attached to the distal end thereof so that the cable 41 can be detachably connected to an existing video deck or the like. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the image display apparatus may be arranged to receive external radio signals through an antenna connected thereto.

As will be clear from the foregoing description, it is possible according to the present invention to provide an image display apparatus capable of providing an observation image which is clear and has minimal distortion even at a wide field angle.

What we claim is:

1. In an image display apparatus comprising an image display device which displays an image, and an ocular optical system which projects the image formed by said image display device and leads the image to an eyeball of an observer, the improvement wherein said ocular optical system has two surfaces, i.e. a first surface and a second surface, in which a space formed by said two surfaces is filled with a medium having a refractive index larger than 1, wherein at least one of the surfaces of said ocular optical system is a non-rotationally symmetric aspherical surface decentered or tilted with respect to an observer's visual axis, and wherein said first surface is a transmitting surface which serves as both an entrance surface for light rays emitted from said image display device and an exit surface through which the light rays exit from said ocular optical system, said first surface being convex toward the observer.

2. In an image display apparatus comprising an image display device which displays an image, and an ocular optical system which projects the image formed by said image display device and leads the image to an eyeball of an observer, the improvement wherein said ocular optical system has a prism member, said prism member including a first surface having an action through which light rays emitted from said image display device enter said prism member and exit therefrom, said prism member further including a second surface having an action by which the light rays entering through said first surface are reflected, wherein a space between said first surface and said second surface is filled with a medium having a refractive index larger than 1, and wherein said first and second surfaces each have a non-rotationally symmetric aspherical surface configuration having an action by which the image formed by said image display device is projected into the observer's eyeball as an enlarged image, said non-rotationally symmetric aspherical surface configuration further having an action by which aberrations caused by decentration are corrected.

3. An image display apparatus according to claim 2, wherein, assuming that a light ray emitted from a center of said image display device and passing through a center of an exit pupil formed by said ocular optical system is defined as an axial principal ray, said axial principal ray forms a V-shaped folded optical path in said prism member, and a sectional configuration of said first surface in a plane (YZ-plane) containing said V-shaped optical path is arranged such that an incident angle at which the axial principal ray emitted from the center of said image display device is incident on said first surface is smaller than an angle of incidence on said first surface of a principal ray emitted from an end portion of said image display device which is closer to the observer's eyeball.

4. An image display apparatus according to any one of claims 1 to 3, wherein, assuming that a light ray emitted from a center of said image display device and passing through a center of an exit pupil formed by said ocular optical system is defined as an axial principal ray, and a Z-axis is defined by a straight line along which said axial principal ray travels after exiting from said exit pupil until it intersects said first surface, and that an axis perpendicularly intersecting the Z-axis and lying in a plane of decentration of one of said first surface and said second surface is defined as a Y-axis, and an axis perpendicularly intersecting both the Z-axis and the Y-axis is defined as an X-axis, both the following conditions are satisfied:

$$0.005 < |CX2(1s)| < 0.1 \ (1/\text{millimeter}) \quad (1)$$

$$0.005 < |CY2(1s)| < 0.1 \ (1/\text{millimeter}) \quad (2)$$

where CX2(1s) and CY2 are defined such that in an exit region of said first surface through which light rays emitted from said image display device exit from said ocular optical system toward said observer's eyeball after entering said ocular optical system and being reflected by said second surface, a curvature in an X-axis direction at an area through which said axial principal ray exits is CX2(1s), and a curvature in a Y-axis direction at said area is CY2(1s).

5. An image display apparatus according to any one of claims 1 to 3, wherein, assuming that a light ray emitted from a center of said image display device and passing through a center of an exit pupil formed by said ocular optical system is defined as an axial principal ray, and a Z-axis is defined by a straight line along which said axial principal ray travels after exiting from said exit pupil until it intersects said first surface, and that an axis perpendicularly intersecting the Z-axis and lying in a plane of decentration of one of said first surface and said second surface is defined as a Y-axis, and an axis perpendicularly intersecting both the Z-axis and the Y-axis is defined as an X-axis, the following condition is satisfied:

$$0.05 < DY(1s) < 1.5 \quad (5)$$

where DY(1s) represents DY1(1s)–DY3(1s), in which DY1(1s) and DY3(1s) are defined such that in an exit region of said first surface through which light rays emitted from said image display device exit from said ocular optical system toward said observer's eyeball after entering said ocular optical system and being reflected by said second surface, a first-order differential in a Y-axis direction at an area through which a principal ray at a maximum field angle in a positive direction of the Y-axis in a YZ-plane exits is DY1(1s), and a first-order differential in the Y-axis direction at an area through which a principal ray at a maximum field angle in a negative direction of the Y-axis in the YZ-plane is DY3(1s).

6. An image display apparatus according to any one of claims 1 to 3, wherein, assuming that a light ray emitted from a center of said image display device and passing through a center of an exit pupil formed by said ocular optical system is defined as an axial principal ray, and a Z-axis is defined by a straight line along which said axial principal ray travels after exiting from said exit pupil until it intersects said first surface, and that an axis perpendicularly intersecting the Z-axis and lying in a plane of decentration of one of said first surface and said second surface is defined as a Y-axis, and an axis perpendicularly intersecting both the Z-axis and the Y-axis is defined as an X-axis, the following condition is satisfied:

$$0.3 < CX1(1n)/CX3(1n) < 5 \quad (7)$$

where CX1(1n) and CX3(1n) are defined such that in an entrance region of said first surface through which light rays emitted from said image display device enter said ocular optical system, a curvature in an X-axis direction at an area through which a principal ray at a maximum field angle in a positive direction of the Y-axis enters is CX1(1n), and a curvature in the X-axis direction at an area through which a principal ray at a maximum field angle in a negative direction of the Y-axis enters is CX3(1n).

7. An image display apparatus according to any one of claims 1 to 3, wherein, assuming that a light ray emitted from a center of said image display device and passing through a center of an exit pupil formed by said ocular optical system is defined as an axial principal ray, and a Z-axis is defined by a straight line along which said axial principal ray travels after exiting from said exit pupil until it intersects said first surface, and that an axis perpendicularly intersecting the Z-axis and lying in a plane of decentration of one of said first surface and said second surface is defined as a Y-axis, and an axis perpendicularly intersecting both the Z-axis and the Y-axis is defined as an X-axis, the following condition is satisfied:

$$-2.0 < DY(1n) < 1.0 \quad (9)$$

where DY(1n) represents DY2(1n)–DY5(1n), in which DY2(1n) and DY5(1n) are defined such that in an entrance region of said first surface through which light rays emitted from said image display device enter said ocular optical system, a first-order differential in a Y-axis direction at an area through which said axial principal ray enters is DY2(1n), and a first-order differential in the Y-axis direction at an area through which a principal ray at a maximum field angle in an X-axis direction enters is DY5(1n).

8. An image display apparatus according to any one of claims 1 to 3, wherein, assuming that a light ray emitted from a center of said image display device and passing through a center of an exit pupil formed by said ocular optical system is defined as an axial principal ray, and a Z-axis is defined by a straight line along which said axial principal ray travels after exiting from said exit pupil until it intersects said first surface, and that an axis perpendicularly intersecting the Z-axis and lying in a plane of decentration of one of said first surface and said second surface is defined as a Y-axis, and an axis perpendicularly intersecting both the Z-axis and the Y-axis is defined as an X-axis, the following condition is satisfied:

$$0.3 < CY1(1n)/CY3(1n) < 8 \tag{11}$$

where CY1(1n) and CY3(1n) are defined such that in an entrance region of said first surface through which light rays emitted from said image display device enter said ocular optical system, a curvature in a Y-axis direction at an area through which a principal ray at a maximum field angle in a positive direction of the Y-axis enters is CY1(1n), and a curvature in the Y-axis direction at an area through which a principal ray at a maximum field angle in a negative direction of the Y-axis enters is CY3(1n).

9. An image display apparatus according to any one of claims 1 to 3, wherein, assuming that a light ray emitted from a center of said image display device and passing through a center of an exit pupil formed by said ocular optical system is defined as an axial principal ray, and a Z-axis is defined by a straight line along which said axial principal ray travels after exiting from said exit pupil until it intersects said first surface, and that an axis perpendicularly intersecting the Z-axis and lying in a plane of decentration of one of said first surface and said second surface is defined as a Y-axis, and an axis perpendicularly intersecting both the Z-axis and the Y-axis is defined as an X-axis, the following condition is satisfied:

$$10 < Fy < 60 \text{ (millimeter)} \tag{15}$$

where Fy is defined such that an absolute value of a sine ($|\sin\theta|$) of an angle ($f$) formed between said axial principal ray and a marginal ray from the center of said image display device which passes through a point at a height H from the center of said exit pupil in a Y-axis direction is defined as a numerical aperture NA, and a value obtained by multiplying a reciprocal of said numerical aperture NA and said height H together is defined as a focal length Fy in a YZ-plane.

10. An image display apparatus according to any one of claims 1 to 3, wherein, assuming that a light ray emitted from a center of said image display device and passing through a center of an exit pupil formed by said ocular optical system is defined as an axial principal ray, and a Z-axis is defined by a straight line along which said axial principal ray travels after exiting from said exit pupil until it intersects said first surface, and that an axis perpendicularly intersecting the Z-axis and lying in a plane of decentration of one of said first surface and said second surface is defined as a Y-axis, and an axis perpendicularly intersecting both the Z-axis and the Y-axis is defined as an X-axis, the following condition is satisfied:

$$10 < Fx < 60 \text{ (millimeter)} \tag{17}$$

where Fx is defined such that an absolute value of a sine ($|\sin\theta|$) of an angle ($\theta$) formed between said axial principal ray and a marginal ray from the center of said image display device which passes through a point at a height H from the center of said exit pupil in an X-axis direction is defined as a numerical aperture NA, and a value obtained by multiplying a reciprocal of said numerical aperture NA and said height H together is defined as a focal length Fx in an XZ-plane.

11. An image display apparatus according to any one of claims 1 to 3, further comprising:
a body unit which contains said image display device and said ocular optical system; and
a support unit which supports said body unit in front of the observer's eyeball.

* * * * *